(12) United States Patent
Purohit et al.

(10) Patent No.: US 9,820,246 B2
(45) Date of Patent: Nov. 14, 2017

(54) SYNCHRONIZING ACTIVE WINDOW BOUNDARIES USED FOR DATA TRANSMISSION BETWEEN PAIRS OF NODES OF A WIRELESS NETWORK

(71) Applicant: GainSpan Corporation, San Jose, CA (US)

(72) Inventors: Sibasis Purohit, Bangalore (IN); Pankaj Vyas, Bangalore (IN)

(73) Assignee: GainSpan Corporation, San Jose, CA (US)

( * ) Notice: Subject to any disclaimer, the term of this patent is extended or adjusted under 35 U.S.C. 154(b) by 177 days.

(21) Appl. No.: 14/724,843

(22) Filed: May 29, 2015

(65) Prior Publication Data
US 2016/0353396 A1    Dec. 1, 2016

(51) Int. Cl.
*H04J 3/06* (2006.01)
*H04W 4/06* (2009.01)
*H04W 56/00* (2009.01)
*H04L 12/939* (2013.01)

(52) U.S. Cl.
CPC ......... *H04W 56/001* (2013.01); *H04J 3/0661* (2013.01); *H04L 49/552* (2013.01); *H04W 4/06* (2013.01)

(58) Field of Classification Search
CPC ... H04L 49/201; H04L 49/552; H04L 49/602; H04W 4/06; H04W 76/002; H04W 80/04; H04W 84/02
See application file for complete search history.

(56) References Cited

U.S. PATENT DOCUMENTS 7,012,881 B2 *   3/2006   Kim ................ H04L 27/2657
                                                         370/208
7,656,831 B2     2/2010   Gao et al.
                          (Continued)

FOREIGN PATENT DOCUMENTS

EP            2701318 A1      2/2014

OTHER PUBLICATIONS

David Rodenas-Herraiz, Antonio-Javier Garcia-Sanchez, Felipe Garcia-Sanchez and Joan Garcia-Haro, Current Trends in Wireless Mesh Sensor Networks, http://www.ncbi.nlm.nih.gov/pmc/articles/PMC3690041/, date May 10, 2013, pp. 1-38.

(Continued)

*Primary Examiner* — Alpus H Hsu
(74) *Attorney, Agent, or Firm* — Pearl Cohen Zedek Latzer Baratz LLP

(57) ABSTRACT

An aspect of the present disclosure enables each receiver node of a wireless network to synchronize active widows with those of the sender node. In an embodiment, a receiver node receives a packet from a sender node on a wireless network, with the packet including data indicating a position of the packet in an active window of the sender node. The receiver node determines the position at which the packet is received in an active window of the receiver node. The receiver node determines a difference between the two positions and adjusts a start position of the next active window (of the receiver node) based on the determined difference to synchronize the future active windows at the receiver node to respective active windows at the sender node.

17 Claims, 9 Drawing Sheets

(56) References Cited

U.S. PATENT DOCUMENTS

| | | | | |
|---|---|---|---|---|
| 7,747,273 | B2* | 6/2010 | Chou | H04W 52/0216 370/318 |
| 7,809,097 | B2* | 10/2010 | Wang | H04L 27/2656 375/149 |
| 7,844,308 | B2 | 11/2010 | Rhee et al. | |
| 7,882,084 | B1* | 2/2011 | Amdahl | G06F 17/30522 707/693 |
| 7,995,508 | B2 | 8/2011 | Ruy et al. | |
| 8,014,329 | B2 | 9/2011 | Gong | |
| 8,274,894 | B2 | 9/2012 | Kneckt et al. | |
| 8,295,217 | B2* | 10/2012 | Kone | H04L 1/188 370/311 |
| 8,363,581 | B2 | 1/2013 | Kim et al. | |
| 8,412,287 | B2* | 4/2013 | Qi | H04W 52/0251 370/329 |
| 8,547,888 | B2 | 10/2013 | Filoso et al. | |
| 8,767,771 | B1 | 7/2014 | Shukla et al. | |
| 9,084,135 | B2* | 7/2015 | Park | H04W 52/0229 |
| 2003/0081664 | A1* | 5/2003 | Lu | H04L 49/90 375/222 |
| 2004/0176147 | A1* | 9/2004 | Escalante | H04W 52/0293 455/574 |
| 2006/0253735 | A1 | 11/2006 | Kwak et al. | |
| 2008/0175275 | A1* | 7/2008 | Garner | H04J 3/0667 370/503 |
| 2009/0274082 | A1 | 11/2009 | Wentink | |
| 2010/0290572 | A1* | 11/2010 | Garner | H04J 3/0667 375/356 |
| 2011/0228716 | A1* | 9/2011 | Xue | H04H 20/28 370/312 |
| 2014/0112226 | A1 | 4/2014 | Jafarian et al. | |

OTHER PUBLICATIONS

Jakub Flotynski, Rafal Krenz, A Wireless Mesh Network enabling the implementation of a Deterministic Medium Access, http://pwt.et.put.poznan.pl/PWT_2011/PWT%202011_9266.pdf , downloaded circa Feb. 17, 2015, pp. 1-4.

S.P. Shiva Prakash, T.N. Nagabhushan, Kirill Krinkin, Energy Aware Power Save Mode Management in Wireless Mesh Networks, https://fruct.org/publications/fruct14/files/Pra_18.pdf , Open Innovations Association (FRUCT), 14th Conference of Year: 2013, downloaded circa Feb. 17, 2015, pp. 122-131.

Munhwan Choi, Sunggeun Jin, Sunghyun Choi, Power Saving for Multi-Radio Relay Nodes in IEEE 802.11 Infrastructure Networks, http://www.mwnl.snu.ac.kr/~schoi/publication/Conferences/07-APWCS.pdf , downloaded circa Feb. 17, 2015, pp. 1-5.

* cited by examiner

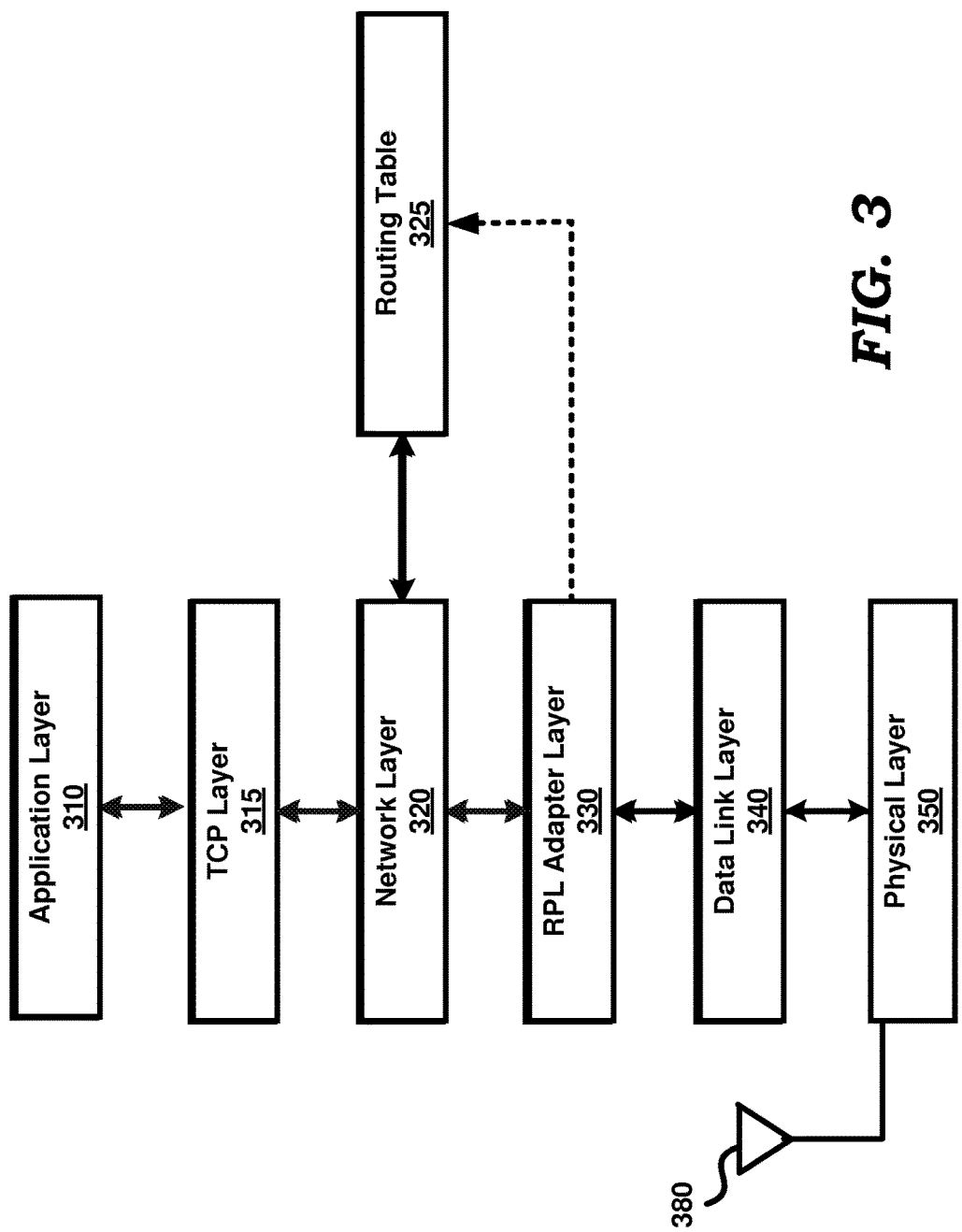

SYNCHRONIZING ACTIVE WINDOW BOUNDARIES USED FOR DATA TRANSMISSION BETWEEN PAIRS OF NODES OF A WIRELESS NETWORK

BACKGROUND

Technical Field

The present disclosure relates to wireless networks, and more specifically to synchronizing active window boundaries used for data transmission between pairs of nodes of a wireless network.

Related Art

A wireless network generally includes two or more wireless stations capable of communicating with each other on a wireless medium. The wireless network may include access points or router nodes (in general, switches) in the communication path between wireless stations for providing switching function between the wireless stations. Any of such devices (i.e., wireless stations, access points and router nodes) may be termed as nodes of the wireless network.

Data transmission generally involves sending of a data packet from a sender node and reception of that packet by a receiver node. For example, a wireless station may transmit a data packet to an adjacent switch, and the switches of the wireless network may eventually deliver the data packet to a destination wireless station. It may thus be appreciated that the sender node and receiver node for each hop constitute a pair of nodes for that hop.

Active window, with respect to sender nodes, refers to a duration in which a sender can send data packets, and is contrasted with inactive durations in which the sender may not send packets. For example, nodes may operate in power savings mode, in which at least some of the components are powered down, and the corresponding durations are inactive durations. Thus, a sender node is capable of sending packets when not in power savings mode.

Active window, with respect to receiver nodes, refers to a duration in which a receiver can receive packets, and is contrasted with inactive durations in which the receiver may be incapable of receiving packets. Similar to sender nodes, receiver nodes may operate in power savings mode, in which at least some of the components are powered down, and the corresponding durations are inactive durations. Thus, a receiver node is capable of receiving packets when not in power savings mode. The start and end instances of an active window may be termed as start boundary and end boundary of the active window respectively.

There may be a general need to synchronize the active window boundaries between the sender and receiver nodes. Synchronization implies aligning the start and end boundaries of the active window of the sender node with those of the active window of the receiver, within any pre-specified acceptable deviations. Absence of synchronization may result in the receiver not receiving the packet data (i.e., packet loss), or with the receiver having to operate with longer active window than would be required when precisely synchronized with the active window of the sender node to avoid packet loss.

Several aspects of the present disclosure are directed to techniques for synchronizing active window boundaries used for data transmission between pairs of nodes of a wireless network.

BRIEF DESCRIPTION OF THE VIEWS OF DRAWINGS

Example embodiments of the present invention will be described with reference to the accompanying drawings briefly described below.

FIG. 3 is a block diagram showing the various communication layers in a node of wireless mesh network, in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present disclosure enables each receiver node of a wireless network to synchronize active widows with those of the sender node. In an embodiment, a receiver node receives a packet from a sender node on a wireless network, with the packet including data indicating a position of the packet in an active window of the sender node. The receiver node determines the position at which the packet is received in an active window of the receiver node. The receiver node determines a difference between the two positions and adjusts a start position of the next active window (of the receiver node) based on the determined difference to synchronize the future active windows at the receiver node to respective active windows at the sender node.

In an embodiment, the sender node includes the data indicating the position in a broadcast packet, if the packet is transmitted within a trigger point (e.g., half-way point of the active window). Otherwise, a new packet is formed to include the position data and inserted into the transmission stream.

According to another aspect, the start and end boundaries of active windows are adjusted to reduce the active window durations, with the reduction being proportionate to the number of levels the receiver node is away from the root node of the wireless network.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
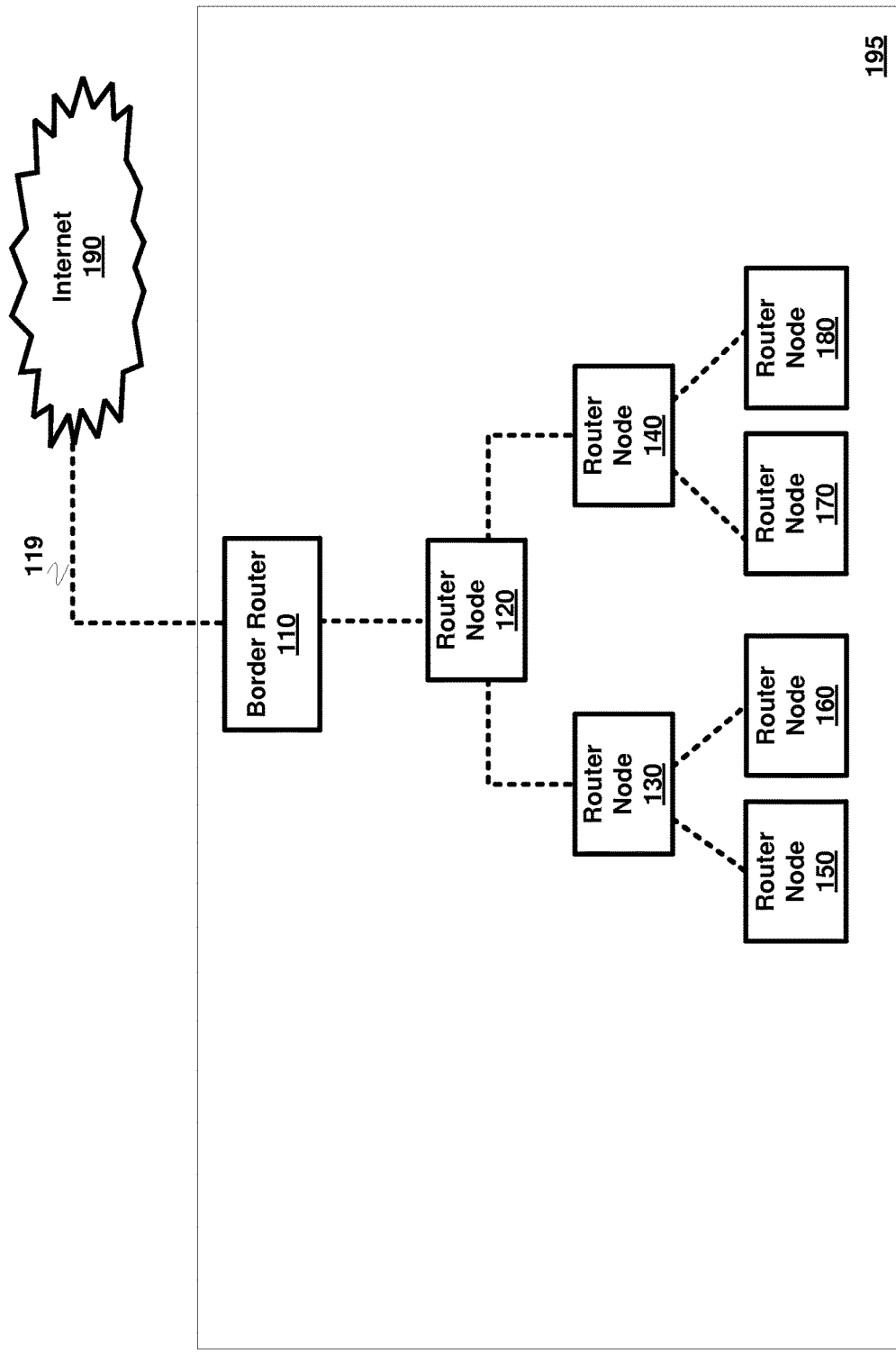
FIG. 1 is a block diagram of an example environment in which several aspects of the present disclosure may be implemented.

FIG. 1 is a block diagram representing an example environment in which several aspects of the present disclosure can be implemented. The example environment is shown containing only representative devices and systems for illustration. However, real world environments may contain more or fewer systems/devices. FIG. 1 is shown containing border router node 110, router nodes 120-180, and internet 190.

Each of the nodes of FIG. 1 shown contained in wireless network (mesh) 195 represents a wireless device. As may be observed, the wireless nodes are shown organized hierarchically based on operation of protocols such as RPL ("Routing Protocol for Low-Power and Lossy Networks"). Each dotted line of FIG. 1 thus represents a direct wireless path between two adjacent nodes in the formed hierarchy. The corresponding pair of wireless nodes (connected by a dotted line) are within the communication range of each other.

In general, a pair of nodes within communication range of each other are said to be neighbors. Thus, each pair of adjacent nodes in the hierarchy are neighbors, though there can be other neighbors which are not adjacent nodes in the hierarchy. Thus, for example, nodes 150 and 160 are neighbors of nodes 130, and nodes 130 and 140 are neighbors of nodes 120, etc., in the hierarchy. An operator/user may configure/designate which one(s) of the nodes are to operate as a border router (110 in FIG. 1) and as router nodes (120-180).

Internet 190 extends the connectivity of nodes in mesh network 195 to various systems (not shown) connected to, or part of, internet 190. Internet 190 is shown connected to border router 110 through a wireless path 119. Internet 190 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across the wireless network.

An IP packet is said to be directed to a destination system when the destination IP address of the packet is set to the IP address of the destination system, such that the packet is eventually delivered to the destination system. A destination IP address may specify all the machines in the network (broadcast address) or a subset of such all the machines (multicast address). When the packet contains content such as port numbers, which specifies the destination application, the packet may be said to be directed to such application as well. The destination system may be required to keep the corresponding port numbers available/open, and process the packets with the corresponding destination ports.

In an embodiment, mesh network 195 is formed according to RFC 6550 entitled, "RPL protocol (IPv6 Routing Protocol for Low-Power and Lossy Networks)", by the Internet Engineering Task Force (IETF). In alternative embodiments, however, mesh 195 may be formed using other approaches. In general, the nodes in mesh 195 represent a hierarchy, with border router 110 representing the root of the hierarchy, and end nodes representing corresponding leaf nodes of the hierarchy. Border router 110, as well as each of the router nodes of FIG. 1, may store routing information (e.g., in the form of routing tables) to enable routing of data packets by forwarding the data packets to a corresponding next-hop node in mesh 195, as is well known in the relevant arts.

Although FIG. 1 is described with respect to router nodes, the features of the present disclosure can be implemented in the other types of nodes such as wireless stations (e.g., end-devices) and access points, without departing from the scope and spirit of various aspects of the present invention, as will be apparent to one skilled in the relevant arts by reading the disclosure provided herein.

As may be readily appreciated, neighbors of such IP network exchange data packets, and it is desirable that the send and receive active windows between each pair of nodes be synchronized. Aspects of the present disclosure relate to synchronizing of boundaries of active windows in neighbor nodes in a wireless network, as described below with examples.

3. Adjusting Active Windows of Neighbor Nodes

Figure 2:
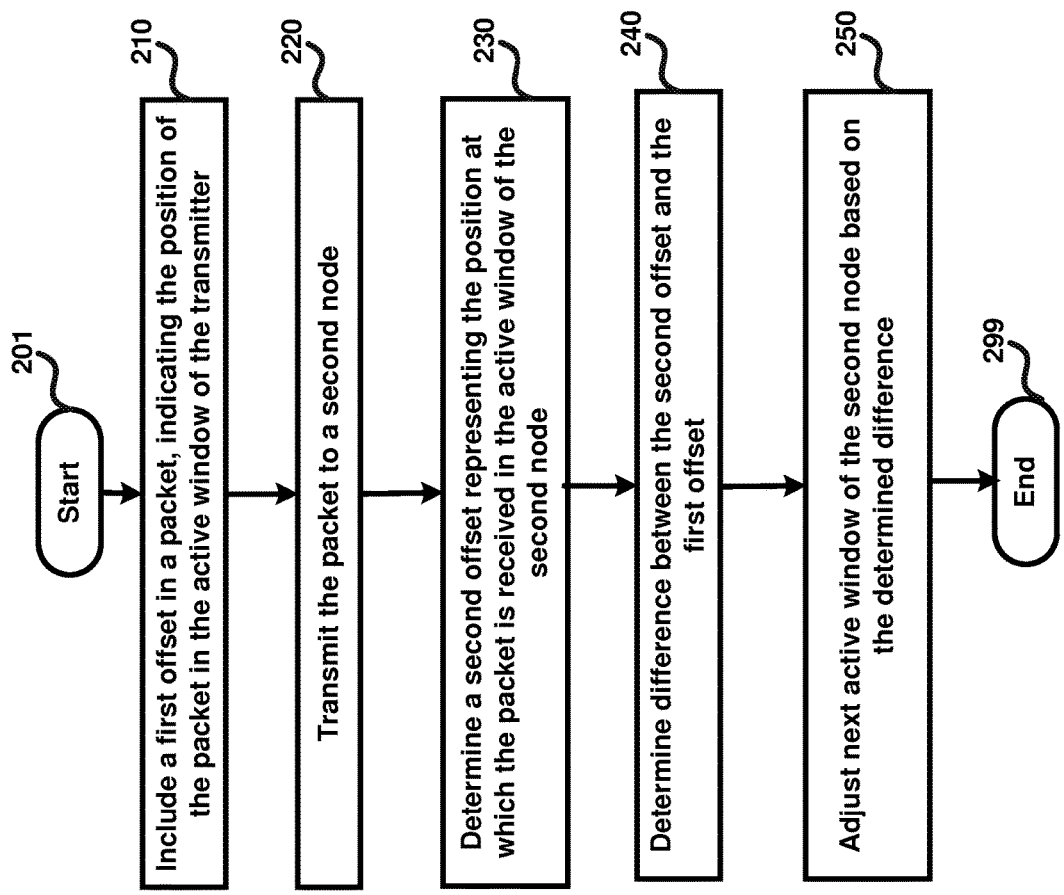
FIG. 2 is a flow chart illustrating the manner in which active windows of neighbor nodes are adjusted, in an embodiment of the present disclosure.

FIG. 2 is a flow chart illustrating the manner in which active windows of neighbor nodes are adjusted, in an embodiment of the present disclosure. Merely for illustration, the flowchart is described below as being performed with router node 120 as a sender and router node 130 as the receiver. However, the features can be implemented in the other router nodes of FIG. 1 also, as well as in other environments, without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, router node 120 generates a packet that includes a first offset indicating the position of the packet in the active window of the transmitter. In the example described in FIG. 2, router node 120 is assumed to be the transmitter. The position of the packet may be indicated as a position of a start bit or end bit of the packet, relative to a pre-determined part of the active window. For example, the first bit of the packet may be determined from the starting position of the active window, the ending position of the active window, or some other fixed point in the active window.

In step 220, router node 120 transmits the packet to a second node, router node 130. As described earlier with reference to FIG. 1, a pair of nodes within communication range of each other (i.e., neighbors) may send and receive packets. Although step 220 is described with respect to a unicast packet transmitted between two nodes, it should be noted that the description is also applicable to a broadcast packet broadcast by the transmitter, in which case all nodes within the listening vicinity of the transmitter will receive the packet. In such a case, each of the receiver nodes may be configured to further process the received packet only if it is a child node in the mesh network, with reference to the transmitter node.

In step 230, router node 130 determines a second offset representing a position at which the transmitted packet is received in the active window of the second node 130. As described earlier with respect to the first offset, the position of the packet in the second offset may be indicated as a position (of the first bit of the packet) relative to a predetermined part of the second node's active window (e.g., starting position of the active window, ending position of the active window, or some other fixed point in the active window). In general, the offsets of steps 210 and 230 needs to be according to a same/consistent convention.

In step 240, router node 130 determines the difference between the second offset (i.e., determined in router node 130) and the first offset indicated in the received packet. The active windows of sender nodes and receiver nodes are often misaligned (out of synchronization), e.g., due to inconsistent hardware, etc., and the difference is used for resynchronization, as described below.

In step 250, router node 130 adjusts its next active window based on the determined difference in step 240. For example, if the difference determined in step 240 is +5 ms (milliseconds), it implies that router node 130 is 5 ms farther in its active window than router node 120 is in its active window. Therefore, router node 130 adjusts its next active window to start 5 ms later than it would have otherwise started. As a further example, if the difference determined in step 240 is −10 ms, it implies that router node 130 is 10 ms slower in its active window than router node 120 is in its active window. Therefore, router node 130 adjusts its next active window to start 10 ms earlier than it would have otherwise started. The flowchart ends in step 299.

Thus, in accordance with FIG. 2, a router node may easily synchronize its own active window with reference to the transmitter's active window by calculating the difference in the progression of the two active windows, and adjusting its own next active window based on the calculated difference (if any).

The features described above can be implemented in various ways, as will be apparent to a skilled practitioner based on the disclosure provided herein. The description is continued with respect to some example embodiments.

4. Communication Layers

FIG. 3 is a block diagram showing the various communication layers (protocol stack) in a node of wireless mesh network 195. Merely for illustration, it is assumed that the blocks of FIG. 3 are contained in router node 120. However, the other devices of wireless mesh network 195 may have similar or identical protocol stacks.

Application layer 310, TCP layer 315, network layer 320, data link layer 340 and physical layer 350 of FIG. 3 may be implemented to generally conform to protocols/models such as those based on the ISO OSI (International Standards Organization Open Systems Interconnect) model and TCP/IP, and are only briefly described below, since the corresponding implementations of the blocks would be well known to one skilled in the relevant arts on reading the disclosure herein. Further, only the relevant blocks of the protocol stack are shown in FIG. 3, and typically more blocks (such as transport layer etc.) according to the ISO OSI model may be present, as also would be apparent to one skilled in the relevant arts.

Physical layer 350 represents the electrical and physical interface between node 120 and a transmission medium (here a wireless medium). Physical layer 350 receives data from data link layer 340 and forwards the data to antenna 380 for transmission. Physical layer 350 receives data from antenna 380 and forwards the data to data link layer 340.

Data link layer 340, operates to provide a reliable data link between node 120 and other nodes in mesh network 195, and may perform medium access control (MAC), logical link control (LLC), as well as error checking operations. Physical layer 350 and data link layer 340 may be designed to conform to the IEEE 802.11 family of specifications, and can be implemented in a known way in accordance with the description provided herein.

RPL adapter layer 330 performs operations needed to enable node 120 to become part of wireless mesh network 195 by participating in forming routing information in routing nodes of wireless mesh network 195, as known in the relevant arts. Thus, RPL adapter layer 330 may form DIO messages (which are then forwarded via data link layer 340 and physical layer 350 for transmission via antenna 380) to advertise presence of node 120 to other nodes in the listening vicinity of node 120. RPL adapter layer 330 may receive DAO messages from other router nodes and/or end nodes (via antenna 380, physical layer 350 and data link layer 340), create and populate routing table 325 with the corresponding entries, aggregate DAO messages from nodes lower in the hierarchy and communicate information contained therein to a node higher in the hierarchy, etc., according to the RPL protocol, as is well known in the relevant arts.

Network layer 320 (present only in case of router nodes) performs operations to enable delivery (by appropriate routing) of data packets from one node to another node in a network (here wireless mesh network 195). Network layer 320 may retrieve/inspect entries stored in routing table 325 to assist in the routing operations (i.e., determining the next hop information). Network layer 320 instructs data link layer 340 to transmit IP packet to the next hop MAC address determined based on examination of routing table 325.

Transmission Control Protocol (TCP) layer 315 provides a reliable stream of data to applications executing in application layer 310, based on unreliable transport of data packets provided by network layer 320. Similarly, TCP layer 315 operates to receive a sequence of bytes from an application in application layer 310, and uses the services provided by network layer 320 to transmit the sequence, in the form of one or more packets.

Application layer 310 may be viewed as containing various applications which provide any desired functionality to users. It should be appreciated that TCP layer 315 and application layer 310 may not be present in those of the nodes of FIG. 1, which merely operate as routers.

According to an aspect of the present disclosure, data link layer 340 incorporates the first offset of step 210 when operating as sender, and also performs steps 230, 240 and 250 when operating as a receiver. The details of such implementation in an embodiment are described in sections below. The description is continued with the packet format of wireless packets supporting such an implementation in an embodiment.

5. Wireless Packet Format

Figures 4A, 4B:
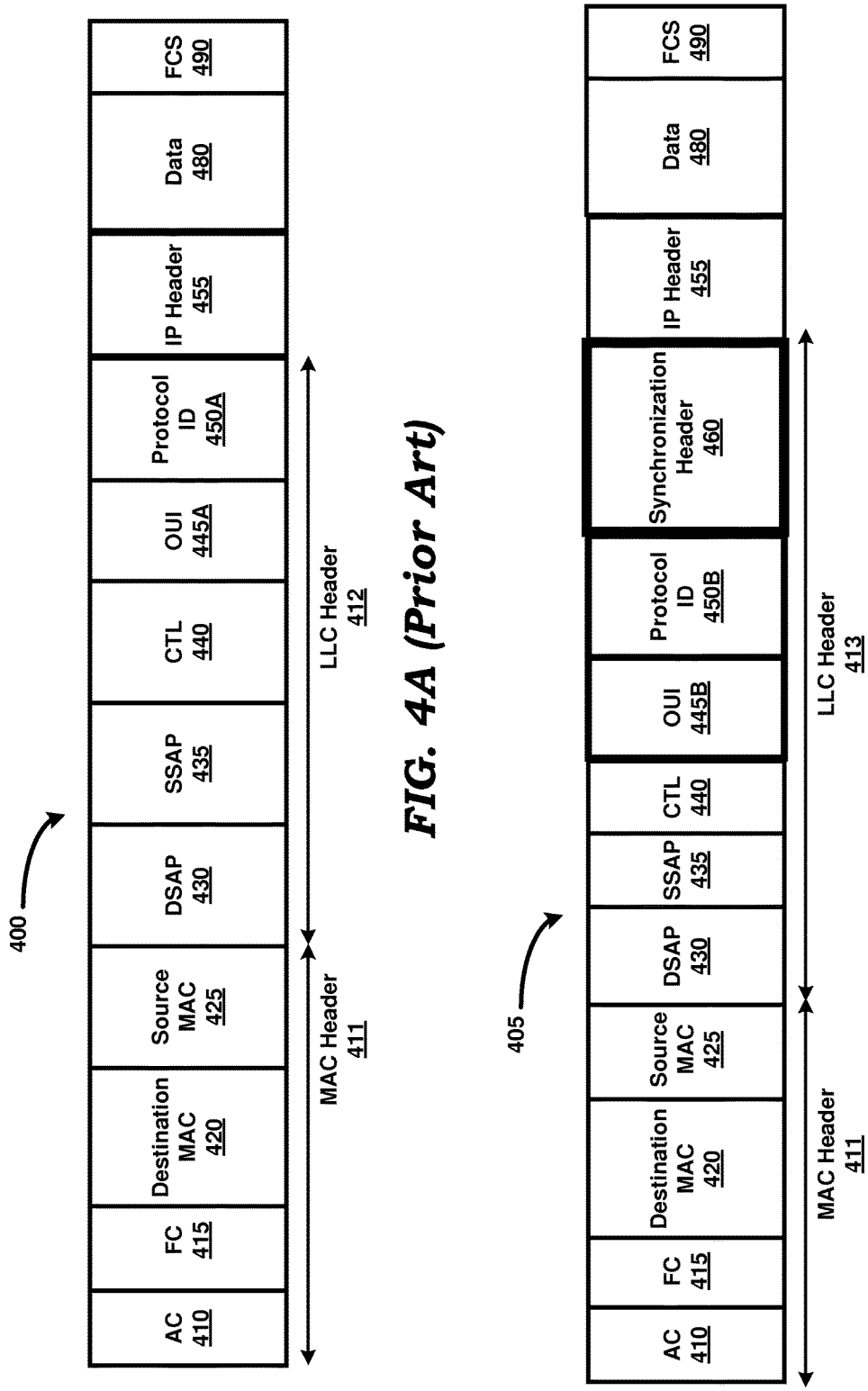
FIG. 4A shows the format of a wireless packet in accordance with 802.11 standards, in an embodiment.
FIG. 4B shows the format of a synchronized packet according to an aspect of the present disclosure.

FIG. 4A shows the format of a wireless packet 400 (which is also a layer-2 data packet) in accordance with 802.11 standards. A detailed description of the fields of the wireless packet 400 is provided in Section 8 of the IEEE Std 802.11-2012 document available with the International Telecommunications Union (ITU). Only those fields as relevant to this disclosure are described herein. It is also noted that, in practice, wireless packet 400 may contain more or fewer fields depending on the specific deployment environment.

Wireless packet 400 is shown containing a MAC header 411, LLC header 412, IP header 455, data 480, and FCS 490. Destination MAC address 420 and Source MAC address 425 are shown encapsulated in MAC header 411, and respectively represent the MAC addresses of the receiver and transmitter of packet 400. The payload (data) sought to be transmitted (by the source wireless station) in the packet is contained in the field data 480.

In an embodiment, fields OUI 445A and protocol ID 450A are used to provide protocol information on custom protocols. OUI (IEEE Organizationally Unique Identifier) 445A stores the organization code of the organization using the custom protocol. When no custom protocols are used, OUI 445A is set as 00-00-00. When an additional/custom protocol is used, the field is set to the corresponding code of the organization. For example, the intended applicant of the instant invention GainSpan uses an organization code 00-1D-C9.

Protocol ID 450A is a 2-octet field that is used to indicate which protocol is encapsulated in the payload of the frame (e.g., IPv4, ARP, etc.). When a SYNC header is present after the LLC header, protocol ID 450A identifies a custom protocol that is used to process the SYNC header, and the corresponding design/implementation will be apparent to one skilled in the relevant arts by reading the disclosure provided herein.

As noted above with reference to FIG. 2, a first router node (transmitter) transmits or broadcasts a packet, which is received by a second router node (receiver), and the second router node synchronizes its own next active window by calculating the difference in the progression of its current active window and the progression in the active window of the transmitter. In an embodiment, where the packet is a broadcast packet, a receiving node synchronizes its next active window only if the transmitted packet was sent from a parent node. The parent-child relationship would be stored in corresponding routing tables in the nodes, as is well known in the relevant arts. The transmitter transmits the necessary information to the receiver via a modified wireless packet, hereinafter referred to as a 'synchronized packet' for the purposes of illustration.

FIG. 4B shows the format of a synchronized packet 405 according to an aspect of the present disclosure. As compared to the wireless packet 400 of FIG. 4A, synchronized packet 405 of FIG. 4B is shown with an additional synchronization header 460 inserted after protocol ID 450B and before IP header 455 (in the bit transmission order).

The OUI field is shown changed to OUI 445B, storing the ID of the organization implementing the custom protocol. Similarly, the protocol ID field is also shown changed to protocol ID 450B, storing an indicator to indicate that a SYNC header follows the LLC header.

Figure 5:
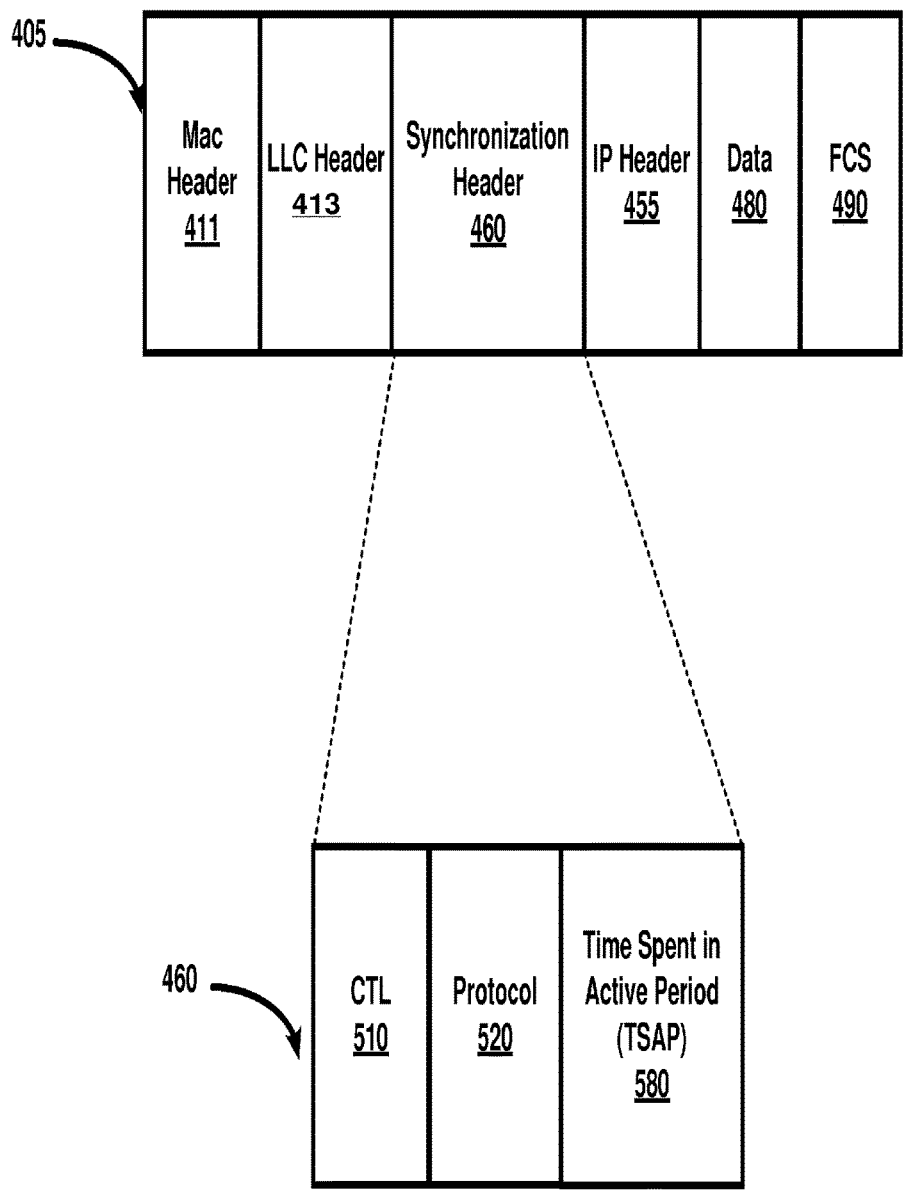
FIG. 5 shows details of the synchronization header in an aspect of the present disclosure.

FIG. 5 shows details of the synchronization header 460 in an aspect of the present disclosure. Synchronization header 460 is shown with fields ctl 510, protocol 520, and time spent in active period (TSAP) 580. In an embodiment, the synchronization header 460 is an 8-byte data structure, with 2 bytes allocated to ctl 510, 2 bytes allocated to protocol 520, and 4 bytes allocated to TSAP 580.

Ctl 510 field indicates which fields are present in the synchronization header. In an embodiment, ctl 510 may identify the follow-on fields, protocol 520, and TSAP 580. Protocol 520 identifies the type of protocol encapsulated in the synchronization header.

TSAP 580 stores an offset indicating the position of the packet in the active window of the transmitter. The position of the packet is indicated in terms of time (e.g., milliseconds) relative to the start boundary of the active window (at the sender). Thus, the offset indicates the time elapsed in the active window of the transmitter prior to the transmission of the packet (synchronization packet) containing the synchronization header. As may be readily appreciated, data link layer 340 constructs the LLC header 413 and can incorporate the offset value in field 580.

An overview of a node with active windows transmitting synchronization packets is described below, particularly with reference to the data packets and synchronization packets generated at different points in the active windows.

6. Active Windows in Nodes

Figure 6:
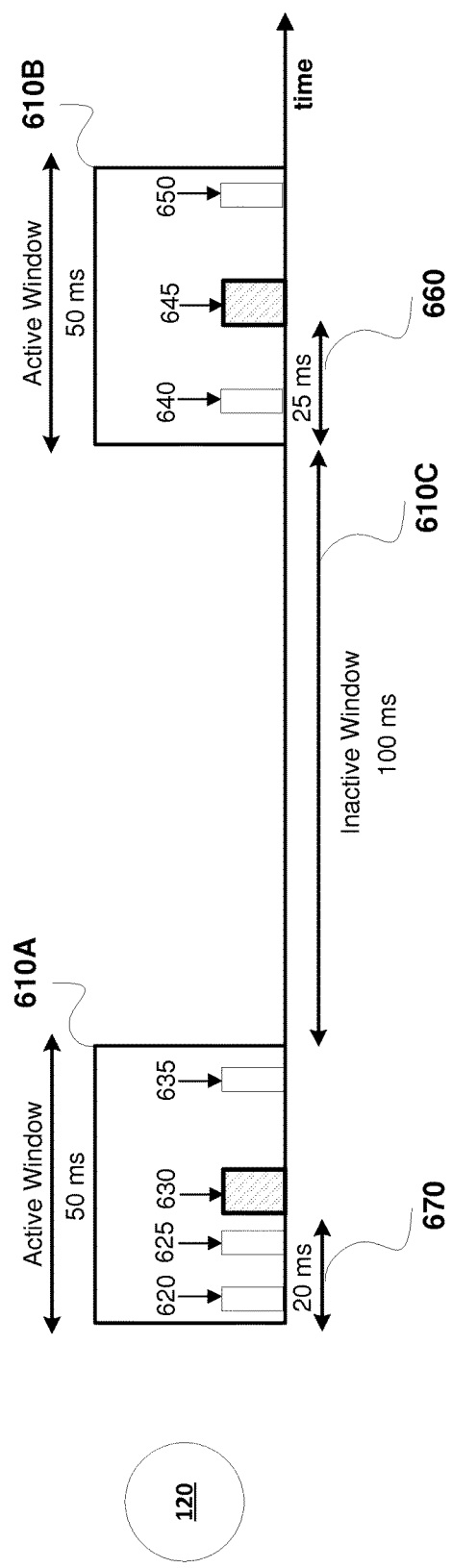
FIG. 6 shows the active windows of a node in an embodiment.

FIG. 6 shows the active windows of node 120, in an embodiment. For the purposes of illustration, the node is shown with two active windows, 610A-610B and an inactive window 610C, although it will be apparent to those skilled in the relevant arts that any number of active and inactive windows may exist with reference to each node.

Each of the active windows 610A and 610B is shown with active periods of 50 milliseconds. The inactive window 610C is shown as having an inactive period of 100 milliseconds. As described earlier, assuming node 120 is the transmitter, the active window refers to a duration in which node 120 can send data packets, while the inactive window is a duration in which node 120 may not send packets.

In an embodiment, one synchronization packet is transmitted in each active window, and is shown shaded in FIG. 6. Further, node 120 is configured such that the synchronization packet is transmitted by modifying a first broadcast packet in each active window if such a broadcast packet is encountered in the first half of the active window. Otherwise, a synchronization packet is generated/formed primarily for the purpose of sending the synchronization header to the receiver As noted earlier, nodes broadcast packets to advertise their presence to other nodes in their listening vicinity (e.g., while joining the mesh network 195) and such packets are used as synchronization packets. Thus, if a broadcast packet is available for transmission in the first half of an active window, that packet is used as a synchronization packet to avoid sending extra packets solely for the purpose of sending the synchronization header to the receiver as depicted in window 610A. Window 610B depicts a case when no such broadcast packets are available in the first half of an active window, and therefore a new synchronization packet is shown generated/formed.

Active window 610A of FIG. 6 is shown containing four (4) packets 620, 625, 630, and 635, and idle time (i.e., no transmission in the active window) of different durations before transmission of each of the packets. Packets 620, 625 and 635 are data packets that may be viewed as non-broadcast transmittals which are sent out to various receiver nodes.

Packet 630 is a first broadcast packet (e.g., a DAO message) in active window 610A, which is broadcast to receiver nodes in the normal course of the node's operation. However, since no other synchronization packets have been transmitted prior to packet 630 (i.e., packets 620 and 625 are merely data packets and not synchronization packets), node 120 incorporates the synchronization header in packet 630, effectively creating a synchronization packet. Synchronization packet 630 is transmitted by node 120 at offset 670. Offset 670 is shown to be 20 milliseconds.

As noted earlier, absent a broadcast packet, node 120 may be configured to trigger a synchronization packet primarily for the purpose of sending the synchronization header to the receiver (e.g., to child nodes in the mesh hierarchy). In an embodiment, node 120 may be configured to monitor the active window to determine the generation of a synchronization packet (e.g., a broadcast packet which was transmitted as a synchronization packet by adding a synchronization header). However, if there is no synchronization packet for a pre-determined period of elapsed time ("trigger time") in the active window, e.g., half-way point of 25 milliseconds, node 120 may be configured to generate/forming a synchronization packet primarily for the purpose of sending the synchronization header to a receiver.

An example is shown in active window 610B containing three (3) packets 640, 645 and 650, and idle time of different durations before transmission of each of the packets. Packets 640 and 650 are data packets that may be viewed as non-broadcast transmittals which are sent out to corresponding target receiver nodes.

As shown, prior to packet 645 (the start of which represents the half-way point of active window 610B), no synchronization packets are transmitted by node 120. Therefore, node 120 generates a synchronization packet 645 primarily for the purpose of sending the synchronization header to a receiver, by incorporating a synchronization header to a wireless packet that contains only such information as is necessary to be transmitted from node 120 to the receiver node (e.g., node 130).

In the synchronization packet 645 transmitted to the receiver node, IP header 455 is not included in the packet, as the packet is generated by data link layer 340 primarily for the purpose of sending the synchronization header to be processed by the corresponding data link layer of the receiver.

Synchronization packet 645 is transmitted by node 120 at offset 660. Offset 660 is shown to be 25 milliseconds, which represents the pre-determined half-way point in the active window duration. As may be understood, synchronization packet 645 may have been transmitted at any point prior to or after offset 660, depending on the configuration of trigger time in node 120.

The description is continued with an example scenario where the next active window of a receiver node is adjusted based on the offset information sent as part of the synchronization packet.

7. Adjusting Next Active Window Based on Offset Information

Figure 7:
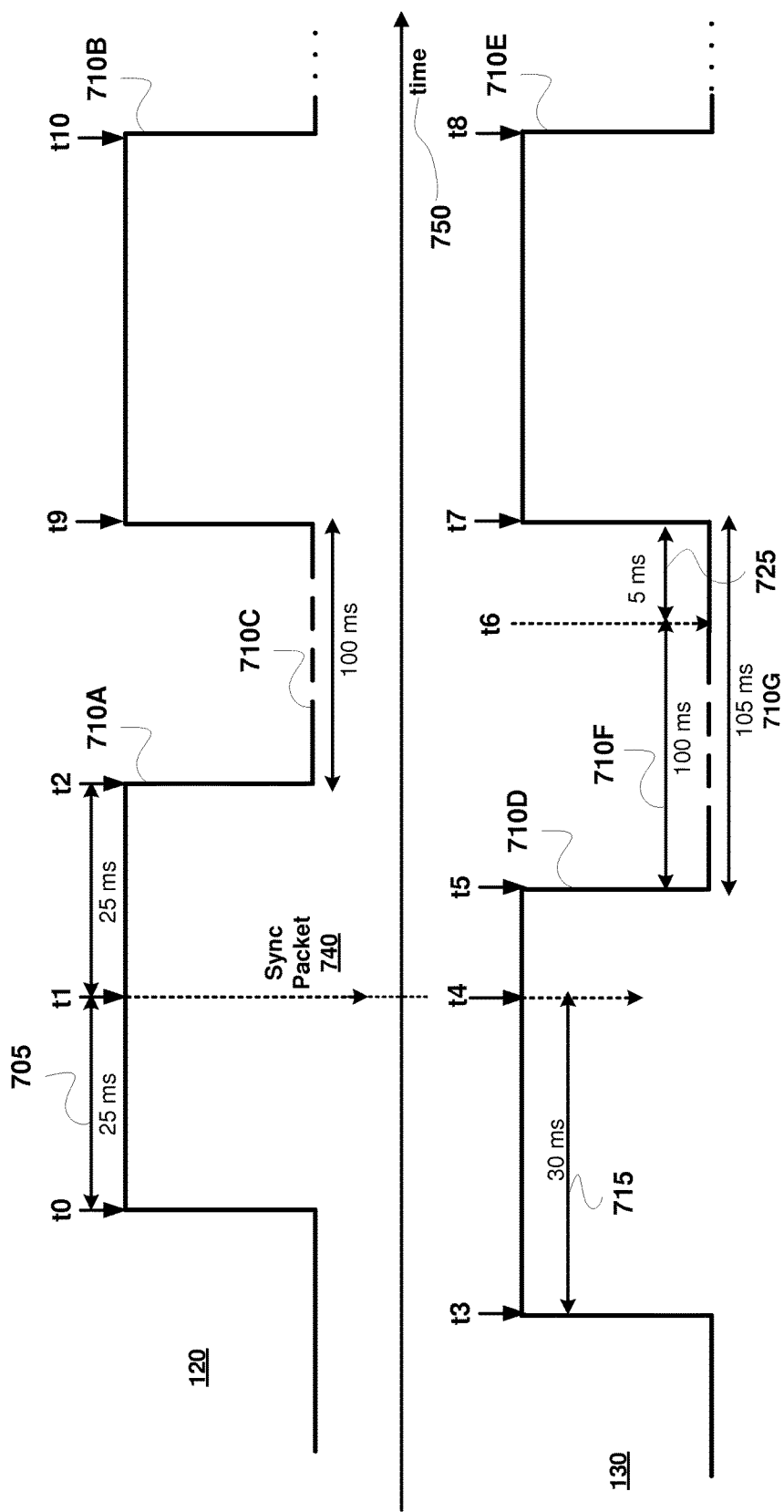
FIG. 7 shows the active windows of a sender node and a receiver node shown with a common time reference, in an embodiment.

FIG. 7 shows the active windows of sender node 120 and receiver node 130 shown with a common time reference for illustration, in an embodiment. For the purposes of illustration, node 120 is shown with two active windows, 710A and 710B and an inactive window 710C, while node 130 is shown with two active windows, 710D and 710E and an inactive window 710F. Each of the active windows has an active period of 50 milliseconds, while the inactive windows have an inactive period of 100 milliseconds. Various times t0-t10 are shown as values on a temporal scale, represented as time 750.

Active window 710A has boundaries represented by times t0 (start) and t2 (end) respectively. Active window 710A shows a synchronization packet 740 being transmitted starting at time t1. As shown, synchronization packet 740 is transmitted at the half-way point of the active window 710A, i.e., first offset 705 is 25 milliseconds. Therefore, time spent in active period (TSAP) 580 field in the corresponding synchronization header of the synchronization packet 740 is assumed to indicate offset 705 value of 25 milliseconds. It should be appreciated that the same payload (data and IP header) is encapsulated afresh with corresponding layer-2 (LLC) header for each node, and thus TSAP 580 will contain a value corresponding to the position of the packet in the active window of transmitter/sender in each hop.

Active window 710D of node 130 has (locally determined) boundaries represented by times t3 (start) and t5 (end) respectively. Node 130 receives the synchronization packet 740 at time t4. As shown, the offset calculated by node 130 to determine the position at which packet 740 is received in the active window 710D is 30 milliseconds, represented by the second offset 715.

As described above with reference to step 240 in FIG. 2, node 130 calculates the difference between the second offset 715 (computed locally) and the first offset 705 (indicated in the received packet), which is +5 milliseconds (i.e., 30 ms−25 ms for the second and first offset respectively), indicating that node 130 is 5 milliseconds farther in its active window than node 120 is in its active window.

As described with reference to step 250 in FIG. 2, node 130 adjusts its next active window based on the difference determined above. Inactive window 710F has a duration of 100 milliseconds, and represents the duration of the inactive window had there been no difference in the second and first offsets. Accordingly, time t6 represents the time at which the next active window 710E was scheduled to start, had there been no correction according to aspects of the present disclosure. However, since a time difference exists, node 130 adds the duration of time difference to the duration of inactive window 710F to compute a modified inactive window time of 105 milliseconds (i.e., 100 ms+5 ms), represented by modified inactive window time 710G.

Accordingly, node 130 starts its next active window 710E after the lapse of the modified inactive window time 710G. As shown, the next active window 710E of receiving node 130 starts at time t7, which is shown to be synchronized with the start time t9 of the next active window 710B of transmitter node 120. Further, the end times t8 and t10 of nodes 130 and 120 respectively are also shown to be synchronized. Therefore, by adjusting its next active window based on the determined time difference between the second and first offsets, node 130 synchronizes its active window boundaries with the active window boundaries of the transmitter.

It may thus be appreciated that each node of network 195 can operate with both edges of the active widows synchronized, thereby ensuring that there is reduced probability of packet loss due to unsynchronized active windows. Such a feature is particularly important in IP-type network based communications, such as between the routers of FIG. 1, where the individual packets are not acknowledged at each hop. At the same time, power savings may be realized due to the precise synchronization as well.

Aspects of the present disclosure provide for further power savings as described below with examples.

8. Active Windows Adjusted According to the Position in the Hierarchy

An aspect of the present disclosure enables nodes at lower levels in the hierarchy to operate with shorter active window durations, thereby consuming less power. The feature is based on an observation that when packets are transmitted in the downward direction (i.e., from border router 110 towards lead nodes 150-180), each intermediate node takes certain duration to receive a packet and certain more duration before re-transmitting the packet. Therefore, at least considering the downward direction of transmission alone, it is observed that the active window of a lower node can start slightly later than the active window of an immediately higher node of the hierarchy.

Similarly, the end of the active window at a lower level can also end slightly before that of the higher layer to the extent a packet transmission has not started by that time. In other words, assuming it requires X milli-seconds for transmission of a smallest packet, and assuming that the higher level node is designed to complete transmission of packets in it's (i.e., that of the higher level node) active window duration, the lower node can end it's active window X milli-seconds ahead of the end of the active window of the higher level node, when a packet is not started to be received by that time.

When considering data transfer in the upward direction, it is observed that the active duration of the higher level node is longer than and covers the active window duration of the lower level. This ensures that the higher level node can reliably receive packets from any of the many lower level nodes both at the end and beginning of the active durations. The corresponding operation in an example scenario is described below with respect to FIG. 8.

Figure 8:
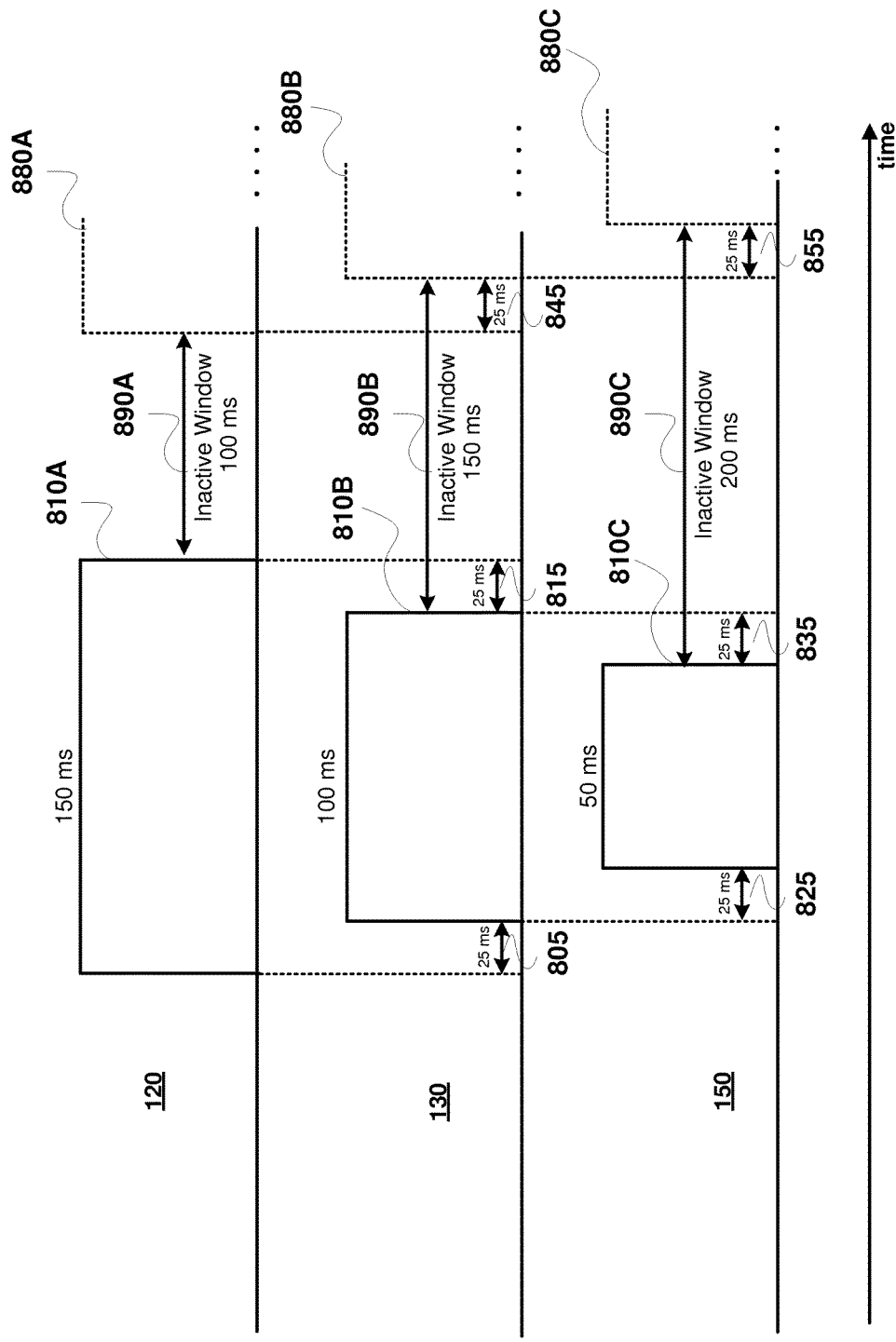
FIG. 8 shows the active windows of three nodes, with the windows shown adjusted according to the nodes' position in the network hierarchy, in an embodiment.

FIG. 8 shows the active windows of node 120, node 130 and node 150, in an embodiment. For the purposes of illustration, nodes 120, 130, and 150 are shown with an active window 810A, 810B, and 810C respectively.

Active window 810A is shown with an active period of 150 milliseconds. Active window 810B is shown with an active period of 100 milliseconds. As shown, the duration of active window 810B is reduced at the start and end, by the durations 805 and 815 respectively, each with a period of 25 milliseconds. Similarly, active window 810C is shown with an active period of 50 milliseconds. The duration of active window 810C is reduced at the start and end, by the durations 825 and 835 respectively, each with a period of 25 milliseconds.

Inactive window 890A is shown with an inactive period of 100 milliseconds, inactive window 890B is shown with an inactive period of 150 milliseconds, and inactive window 890C is shown with an inactive period of 200 milliseconds. The duration of the inactive window 890B is increased (with respect to inactive window 890A) by durations 815 and 845 at the start and end respectively, each with a period of 25 milliseconds. Similarly, the duration of the inactive window 890C is increased by durations 835 and 855 at the start and end respectively, each with a period of 25 milliseconds.

Therefore, the combination of the durations of the respective active and inactive windows of each of the node is a fixed value of 250 milliseconds.

Accordingly, although the active durations of nodes 120, 130, and 150 all include different time durations (i.e., 150 ms, 100 ms, and 50 ms respectively), each of the active durations differ by a fixed/constant value, i.e., pre-specified acceptable deviation. Therefore, the next active windows 880B, and 880C of nodes 130, and 150 respectively have start points that are apart by durations 845 and 855 (relative to active window 880A of node 120), which have the same time duration value (i.e., 25 milliseconds) as the respective time durations 805 and 825 in the previous active windows 810B and 810C respectively.

Thus, whenever the active windows of nodes 120, 130, and 150 become unsynchronized due to drift at either the transmitter or the receiver, the receiver node can adjust its next active window based on the difference in offset value. Synchronizing active window boundaries in such a fashion, using transmission of synchronized packets between pairs of nodes is accomplished in a similar fashion to the embodiments described with reference to FIG. 7, and the description is not repeated herein for conciseness.

In operation, an administrator may specify in all nodes the default active and inactive durations for each cycle. When the router nodes form a hierarchy for purpose of routing (using protocols such as RPL), each node may identify the number of levels it is away from border router 110, and each node may reduce the active window duration proportionate to the corresponding identified number of levels (away from border router 110). As is well known in the relevant arts, when joining an RPL mesh network, each node determines its own rank with reference to a border router.

It may be appreciated that even with different durations, the active windows may be deemed to be synchronized since the reduction is based on a post-synchronization determination. In other words, window 810A is deemed to be synchronized with window 810B even though the start edges of the two windows are not aligned with each other, since the deviation is by design and intended as beneficial.

The implementation details of a router node (110, 120, 130, 150, etc.) in an embodiment of the present disclosure are provided next.

9. Example Implementation

Figure 9:
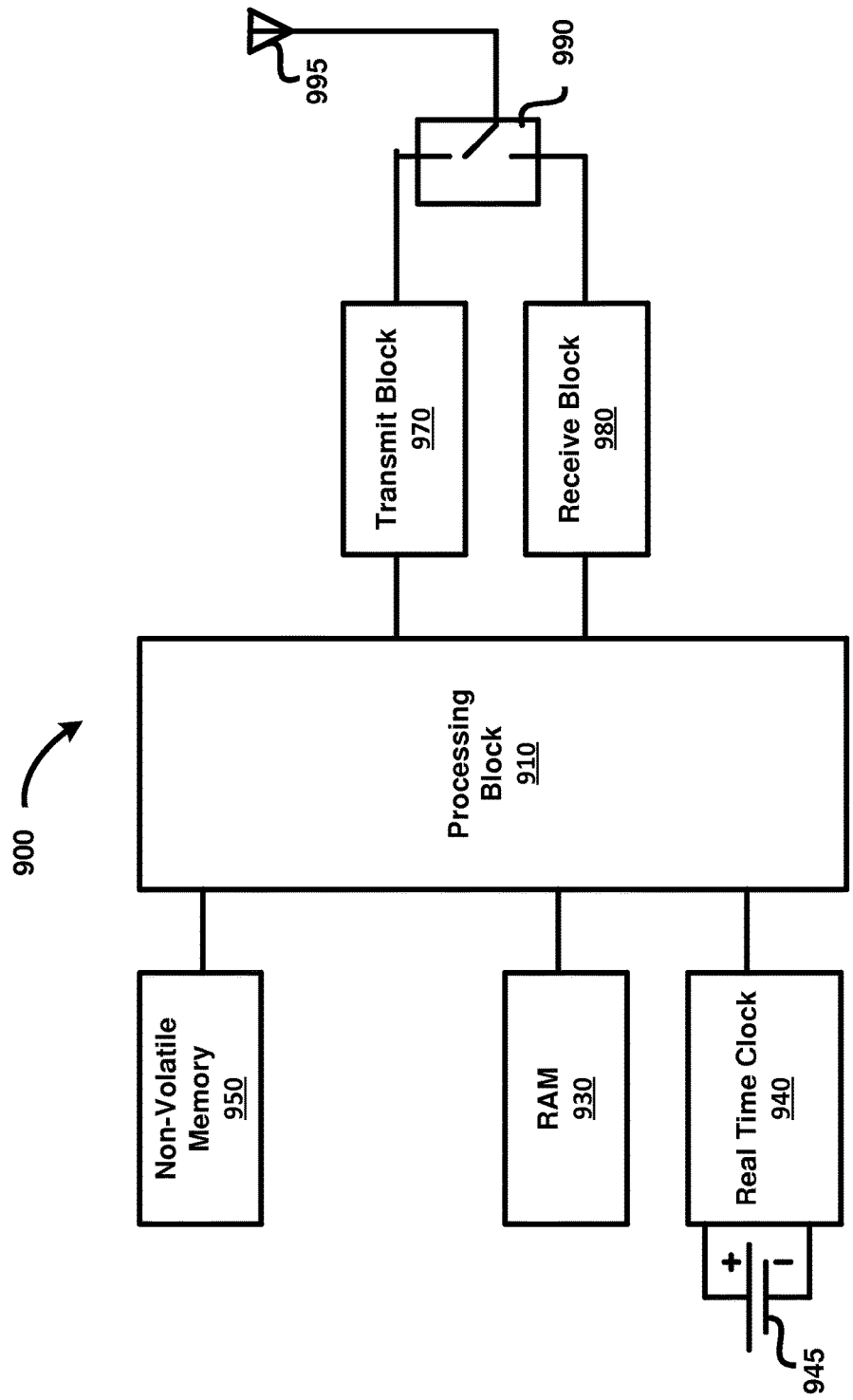
FIG. 9 is a block diagram illustrating the implementation details of a wireless station in an embodiment of the present disclosure.

FIG. 9 is a block diagram showing the implementation details of a router node in an embodiment of the present disclosure. Router 900 can correspond to any of the routers (110, 140, 150, etc.) of FIG. 1, and is shown containing processing block 910, random access memory (RAM) 930, real-time clock (RTC) 940, battery 945, non-volatile memory 990, transmit block 970, receive block 980, switch 990, and antenna 995. The whole of router node 900 may be implemented as a system-on-chip (SoC), except for battery 945 and antenna 995. Alternatively, the blocks of FIG. 9 may be implemented on separate integrated circuits (IC).

Battery 945 provides power for operation of router node 900, and may be connected to the various blocks shown in FIG. 9 (although shown connected only to RTC 940). RTC 940 operates as a clock, and provides the 'current' time to processing block 910.

Antenna 995 operates to receive from, and transmit to, a wireless medium, corresponding wireless signals (e.g., according to IEEE 802.11 (WLAN) standards). It is assumed that the antenna 995 is designed to support both transmission and reception of packets in each active duration described above.

Switch 990 may be controlled by processing block 910 (connection not shown) to connect antenna 995 to one of blocks 970 and 980 as desired, depending on whether transmission or reception of wireless signals is required. Switch 990, antenna 995 and the corresponding connections of FIG. 9 are shown merely by way of illustration. Instead of a single antenna 995, separate antennas, one for transmission and another for reception of wireless signals, can also be used. Various other techniques, well known in the relevant arts, can also be used instead.

Transmit block 970 receives, from processing block 910, data to be transmitted on a wireless signal (e.g., according to a wireless standard such as IEEE 802.11), generates a modulated radio frequency (RF) signal (according to the standard), and transmits the RF signal via switch 990 and antenna 995. Transmit block 470 may contain RF and baseband circuitry for generating and transmitting wireless signals, as well as for medium access operations. Alternatively, transmit block 970 may contain only the RF circuitry, with processing block 910 performing the baseband and medium access operations (in conjunction with the RF circuitry).

Receive block 980 represents a receiver that receives a wireless (RF) signal (e.g., according to IEEE 802.11) bearing data and/or control information via switch 990, and antenna 995, demodulates the RF signal, and provides the extracted data or control information to processing block 910. Receive block 980 may contain RF as well as baseband processing circuitry for processing a WLAN signal. Alternatively, receive block 980 may contain only the RF circuitry, with processing block 910 performing the baseband operations in conjunction with the RF circuitry.

When router 900 is implemented according to IEEE 802.15.4 standards, transmit block 970, receive block 980, antenna 995 and the corresponding signals would be according IEEE 802.15.4.

Non-volatile memory 950 is a non-transitory machine readable medium, and stores instructions, which when executed by processing block 910, causes router node 900 to operate as described above. In particular, the instructions enable router node 900 to operate as described with respect to the flowchart of FIG. 2.

RAM 930 is a volatile random access memory, and may be used for storing instructions and data. RAM 930 and non-volatile memory 950 (which may be implemented in the form of read-only memory/ROM/Flash) constitute computer program products or machine (or computer) readable medium, which are means for providing instructions to processing block 910. Processing block 910 may retrieve the instructions, and execute the instructions to provide several features of the present disclosure.

Processing block 910 (or processor in general) may contain multiple processing units internally, with each processing unit potentially being designed for a specific task. Alternatively, processing block 910 may contain only a single general-purpose processing unit. Processing block 910 may execute instructions stored in non-volatile memory 950 or RAM 930 to enable router node 900 to operate according to several aspects of the present disclosure, described above in detail.

In particular, processing block 910 determines the specific durations in which the transceiver (including transmit block 970, receive block 980, switch 990 and antenna 995) should be inactive, and may switch off at least a portion of some of the components in inactive windows (for saving power). Processing block 910 may define the active and inactive window durations of the transceiver in accordance with the features described above.

7. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method performed in a first node, said method comprising:
   receiving a first packet from a second node on a wireless network, said first packet including a first offset indicating a first position of said first packet in an active window of said second node;
   determining a second offset representing a second position at which said first packet is received in an active window of said first node;
   determining a difference between said second offset and said first offset;
   adjusting a start position of next active window of said first node based on said determined difference to synchronize future active windows at said first node to respective active windows at said second node;
   determining a number of levels in a hierarchy of nodes that the first node is away from a border node of said wireless network; and
   reducing a default active window duration by an amount proportionate to said number of levels to form said active window of said first node.

2. The method of claim 1, wherein said first offset indicating said first position is contained in a layer-2 header of said first packet.

3. The method of claim 2, wherein said first position is specified relative to a start boundary of said active window of said second node, and said second position is specified relative to a start boundary of said active window of said first node.

4. The method of claim 3, wherein said first packet is a layer-3 broadcast packet containing said layer-2 header.

5. The method of claim 4, further comprising:
   forming a sequence of packets for transmission in a second active window; identifying whether there exists at least one layer-3 broadcast packet in said sequence of packets, which is to be transmitted before a trigger point within said second active window;
   if there is at least one layer-3 broadcast packet before said trigger point, modifying the first layer-3 broadcast packet in said sequence of packets to include said first offset indicating the position of the first layer-3 broadcast packet in said second active window, and transmitting the first layer-3 broadcast packet in accordance with said sequence;
   if there is no layer-3 broadcast packet before said trigger point, forming an additional packet containing said first offset indicating the position of said additional packet in said second active window, and transmitting said additional packet along with said sequence of packets in said second active window.

6. The method of claim 5, wherein said first layer-3 broadcast is an Internet Protocol (IP) Packet containing an IP header, and said additional packet does not contain said IP header.

7. The method of claim 1, wherein said default active window duration is reduced both at said start boundary and end boundary in forming said active window for said first node.

8. A non-transitory machine readable medium storing one or more sequences of instructions for enabling a first node of a wireless network to forward packets, said wireless network containing a set of access points and a set of router nodes, said set of access points and said set of router nodes being organized in a hierarchy, wherein execution of said one or more instructions by one or more processors contained in said first node enables said first node to perform the actions of:

receiving a first packet from a second node on a wireless network, said first packet including a first offset indicating a first position of said first packet in an active window of said second node;

determining a second offset representing a second position at which said first packet is received in an active window of said first node;

determining a difference between said second offset and said first offset;

adjusting a start position of next active window of said first node based on said determined difference to synchronize future active windows at said first node to respective active windows at said second node;

determine a number of levels in a hierarchy of nodes that the first node is away from a border node of said wireless network; and reduce a default active window duration by an amount proportionate to said number of levels to form said active window of said first node.

9. The non-transitory machine readable medium of claim 8, wherein said first offset indicating said first position is contained in a layer-2 header of said first packet.

10. The non-transitory machine readable medium of claim 9, wherein said first position is specified relative to a start boundary of said active window of said second node, and said second position is specified relative to a start boundary of said active window of said first node.

11. The non-transitory machine readable medium of claim 10, wherein said first packet is a layer-3 broadcast packet containing said layer-2 header.

12. The non-transitory machine readable medium of claim 11, further comprising instructions for causing said first node to:

form a sequence of packets for transmission in a second active window; identify whether there exists at least one layer-3 broadcast packet in said sequence of packets, which is to be transmitted before a trigger point within said second active window;

if there is at least one layer-3 broadcast packet before said trigger point, modify the first layer-3 broadcast packet in said sequence of packets to include said first offset that indicates the position of the first layer-3 broadcast packet in said second active window, and transmit the first layer-3 broadcast packet in accordance with said sequence;

if there is no layer-3 broadcast packet before said trigger point, form an additional packet containing said first offset that indicates the position of said additional packet in said second active window, and transmit said additional packet along with said sequence of packets in said second active window.

13. A first node of a wireless network, said wireless network containing a set of access points and a set of router nodes, said set of access points and said set of router nodes being organized in a hierarchy, said first node comprising:

a processing block and a memory, said memory to store instructions which when retrieved and executed by said processing block causes said first node to perform the actions of:

receiving a first packet from a second node on a wireless network, said first packet including a first offset indicating a first position of said first packet in an active window of said second node;

determining a second offset representing a second position at which said first packet is received in an active window of said first node;

determining a difference between said second offset and said first offset;

adjusting a start position of next active window of said first node based on said determined difference to synchronize future active windows at said first node to respective active windows at said second node;

determining a number of levels in a hierarchy of nodes the first node is away from a border node of said wireless network; and reducing a default active window duration by an amount proportionate to said number of levels to form said active window of said first node.

14. The first node of claim 13, wherein said first offset indicating said first position is contained in a layer-2 header of said first packet.

15. The first node of claim 14, wherein said first position is specified relative to a start boundary of said active window of said second node, and said second position is specified relative to a start boundary of said active window of said first node.

16. The first node of claim 15, wherein said first packet is a layer-3 broadcast packet containing said layer-2 header.

17. The first node of claim 16, wherein said processing block further performs the action of:

forming a sequence of packets for transmission in a second active window;

identifying whether there exists at least one layer-3 broadcast packet in said sequence of packets, which is to be transmitted before a trigger point within said second active window;

if there is at least one layer-3 broadcast packet before said trigger point, modifying the first layer-3 broadcast packet in said sequence of packets to include said first offset indicating the position of the first layer-3 broadcast packet in said second active window, and transmitting the first layer-3 broadcast packet in accordance with said sequence;

if there is no layer-3 broadcast packet before said trigger point, forming an additional packet containing said first offset indicating the position of said additional packet in said second active window, and transmitting said additional packet along with said sequence of packets in said second active window.

* * * * *